UNITED STATES PATENT OFFICE.

GEORGES DELVAUX, OF MONTIGNY-ON-THE-LOING, ASSIGNOR TO ALFONSE HUILLARD, OF SURESNES, SEINE, FRANCE.

PROCESS OF PURIFYING TANNIC EXTRACTS.

SPECIFICATION forming part of Letters Patent No. 483,141, dated September 27, 1892.

Application filed June 6, 1892. Serial No. 435,749. (No specimens.) Patented in France October 15, 1890, No. 210,204; in Germany February 10, 1891, No. 62,454; in England April 24, 1891, No. 7,106; in Belgium May 2, 1891, No. 94,769; in Spain June 8, 1891, No. 12,044; in Italy June 30, 1891, No. 29,691, and in Austria-Hungary December 7, 1891, No. 2,900 and No. 50,887.

*To all whom it may concern:*

Be it known that I, GEORGES DELVAUX, a citizen of the Republic of France, residing at Montigny sur Loing, Seine et Marne, France, have invented a new and useful Improvement in Means for Decoloring and Clarifying Tannic Extracts, (for which I have obtained Letters Patent in France October 15, 1890, No. 210,204; in Belgium May 2, 1891, No. 94,769; in England April 24, 1891, No. 7,106; in Italy June 30, 1891, No. 29,691; in Spain June 8, 1891, No. 12,044; in Germany February 10, 1891, No. 62,454, and in Austria-Hungary December 7, 1891, No. 2,900 and No. 50,887,) which is fully set forth in the following specification.

The present invention relates to means for decoloring and clarifying tannic extracts, and is applicable indifferently to extracts of all sorts, whether derived from woods—such as chestnut or oak trees—or from leaves—such as sumac—or from barks, peel, or husks, &c.; and it consists, essentially, in the treatment of the juices or extracts from the vats, marking about 2° or 3° Baumé, with a certain quantity of a compound of strontium, as hydrate of strontium, anhydrous oxide of strontium, carbonate of strontium or other salt of this metal. The proportion which ought to be used varies with the degree of decoloration sought to be effected and the degree of concentration of the tannic solutions which are being operated upon. The following proportions give good results: To one thousand liters of tanning-liquor marking above 2.5° Baumé add six kilograms of crystalline hydrate of strontium. The strontium compound selected for this purpose may be added either hot or cold; but I prefer to use it cold. The juices, which before the operation were cloudy and muddy, become at once limpid and clear, the strontium precipitating the coloring-matters contained in the extracts. This precipitation once obtained, one may immediately proceed with the filtration. This done, a small quantity of sulphuric acid should be added, in order to remove any excess of the decolorizing agent remaining in the solution. With the amount of liquor indicated above (one thousand kilos) two kilos of sulphuric acid would be a suitable proportion. After a second filtration or decanting the juices are concentrated *in vacuo* to 20° or 30° Baumé.

The process I have described is applicable to ordinary as well as to concentrated juices.

Having thus described my invention, what I claim is—

The herein-described process of decoloring and clarifying tannic extracts, consisting in adding to the extract a compound of strontium, and thereby precipitating the coloring-matters, substantially as described.

In testimony whereof I have signed this specification in the presence of two subscribing witnesses.

GEORGES DELVAUX.

Witnesses:
 ROBT. M. HOOPER,
 JOSEPH TOURNIER.